(12) United States Patent
Finizio et al.

(10) Patent No.: US 7,792,189 B2
(45) Date of Patent: Sep. 7, 2010

(54) MULTI-CAMERA SURVEILLANCE SYSTEM AND METHOD FOR USING THE SAME

(75) Inventors: Francesco Finizio, Mission Viejo, CA (US); Xavier Bengoechea, Orange, CA (US); Richard Grich, Brunswick, ME (US)

(73) Assignee: Thales Avionics, Inc., Irvine, CA (US)

( * ) Notice: Subject to any disclaimer, the term of this patent is extended or adjusted under 35 U.S.C. 154(b) by 490 days.

(21) Appl. No.: 11/054,732

(22) Filed: Feb. 10, 2005

(65) Prior Publication Data
US 2006/0159164 A1 Jul. 20, 2006

Related U.S. Application Data

(60) Provisional application No. 60/545,079, filed on Feb. 17, 2004, provisional application No. 60/545,062, filed on Feb. 17, 2004.

(51) Int. Cl.
H04N 7/12 (2006.01)
H04N 7/18 (2006.01)

(52) U.S. Cl. .................................. 375/240.01; 348/148
(58) Field of Classification Search ............ 375/240.01; 725/105; 370/401; 709/246; 348/143, 148
See application file for complete search history.

(56) References Cited

U.S. PATENT DOCUMENTS

| 6,092,008 | A | 7/2000 | Bateman | |
| 6,545,601 | B1 | 4/2003 | Monroe | |
| 6,567,984 | B1 | 5/2003 | Allport | |
| 7,131,136 | B2 * | 10/2006 | Monroe | 725/105 |
| 7,460,148 | B1 * | 12/2008 | Clark et al. | 348/143 |
| 2002/0093564 | A1 | 7/2002 | Israel | |
| 2003/0117494 | A1 | 6/2003 | Poblete | |
| 2004/0008253 | A1 | 1/2004 | Monroe | |
| 2004/0021772 | A1 | 2/2004 | Mitchell | |
| 2004/0068583 | A1 * | 4/2004 | Monroe et al. | 709/246 |
| 2004/0119822 | A1 | 6/2004 | Custer et al. | |
| 2004/0136384 | A1 * | 7/2004 | Cho | 370/401 |
| 2004/0136388 | A1 * | 7/2004 | Schaff | 370/401 |
| 2005/0225635 | A1 | 10/2005 | Meitzler et al. | |
| 2005/0248444 | A1 | 11/2005 | Joao | |

FOREIGN PATENT DOCUMENTS

| EP | 1 440 883 A1 | 7/2004 |
| WO | WO 01/03437 A1 | 1/2001 |
| WO | WO 02/076018 A2 | 9/2002 |
| WO | WO 03/041026 A1 | 5/2003 |

* cited by examiner

Primary Examiner—Gims S Philippe
(74) Attorney, Agent, or Firm—Drinker Biddle & Reath LLP

(57) ABSTRACT

An improved multi-camera surveillance system for use on a vehicle such as an aircraft, and a method for implementing the same. The multi-camera surveillance system is capable of displaying a user-selected image from any camera or user-selected images from multiple cameras at multiple viewing stations by flight and cabin crew, as well as recording and maintaining the images at storage locations on the aircraft and making the images available for viewing and recording at locations external to the aircraft by gate personnel, security officers, and incident investigators.

22 Claims, 3 Drawing Sheets

MULTI-CAMERA SURVEILLANCE SYSTEM AND METHOD FOR USING THE SAME

CROSS-REFERENCE TO RELATED PATENT APPLICATIONS

This application claims benefit under 35 U.S.C. §119(e) from U.S. Provisional Patent Application No. 60/545,079, filed Feb. 17, 2004, and U.S. Provisional Patent Application No. 60/545,062, filed Feb. 17, 2004, the entire content of each being incorporated herein by reference.

BACKGROUND OF THE INVENTION

1. Field of the Invention

The present invention relates to a multi-camera surveillance system for use on a vehicle such as an aircraft, and a method for implementing the same. More particularly, the present invention relates to a multi-camera surveillance system for an aircraft that is capable of displaying a user-selected image from any camera or user-selected images from multiple cameras at multiple viewing stations, as well as recording and maintaining the images at storage locations on the aircraft and making the images available for viewing and recording at locations external to the aircraft.

2. Description of the Related Art

Video security cameras have been used for years to monitor activity in secured areas such as banks, convenience stores and so on. Due to their reduced size and cost, security cameras are becoming more and more widespread and can be commonly found in elevators and building corridors, as well as in schools, residences and any area where personal security can be a concern.

Due to a heightened concern for safety aboard commercial passenger aircraft, security cameras are desired to monitor passenger activity in various places of an aircraft cabin, particularly in the vicinity outside the cockpit door. Additionally, the National Transportation and Safety Board recently proposed a regulation that would require the installation of a video camera in the cockpit of each commercial aircraft for recording pilot activities for use in analyzing aircraft accidents.

For use in commercial aircraft applications, each security camera can be mounted at one of several typical installation locations in the aircraft cabin, with each installation location having particular structural surroundings and desired orientation. Depending on the size and configuration of the cabin, the aircraft can be equipped with one or more cameras at these various installation locations.

Traditional security systems provide the simultaneous monitoring and recording of multiple cameras. The monitoring is typically performed by security personnel located in a security office, and the images captured by the cameras are recorded on video tape. Multiple tape players are provided to automatically detect the end of one recording and start the beginning of another.

However, due to space constraints, a typical commercial aircraft cannot provide the necessary space for a security office or additional dedicated security personnel and multiple recorders as would be available in, for example, a building. Rather, the security system would need to be operated by the crew members, and the images captured by the security cameras would need to be monitored by, for example, the cabin crew and flight crew, and possibly the ground or terminal crew if the images were to be transmitted from the airplane to the terminal. The aircraft personnel, in particular, would need to view the images as part of their normal routine.

Accordingly, a need exists for a security system for use on a vehicle, in particular, a commercial aircraft, that is easy to use and maintain, and which is configured so that crew members, for example, flight attendants, can easily view and monitor the images captured by the cameras of the security system as part of their normal routine while performing their other tasks during the flight.

SUMMARY OF THE INVENTION

The embodiments of the present invention described herein provide an improved multi-camera surveillance system for use on a vehicle such as an aircraft, and a method for implementing the same. The multi-camera surveillance system is capable of displaying a user-selected image from any camera or user-selected images from multiple cameras at multiple viewing stations by flight and cabin crew, as well as recording and maintaining the images at storage locations on the aircraft and making the images available for viewing and recording at locations external to the aircraft by gate personnel, security officers, and incident investigators.

The multi-camera surveillance system can comprises a plurality of cameras, each adapted for deployment at respective locations in the vehicle, a plurality of viewing panel, adapted for deployment at a respective location in the vehicle, and a network. The network couples the plurality of cameras and the viewing panels to each other, to enable each viewing panel to selectably view an image captured by any of the cameras or to selectably view a plurality of images captured by a plurality of the cameras simultaneously. The network can include a Power-Over Ethernet (PoE) power supply to supply power to the cameras.

The cameras can encode the images into at least one of MPEG1, MPEG2, MPEG4 or Motion JPEG formats. A plurality of digital server units (DSU) can be coupled to the network, such that each DSU can store at least one image captured by at least one of the cameras. The cameras can provide their images to the DSUs using real time protocols (RTP). Furthermore, a plurality of offload interfaces can be provided, such as RJ45 Ethernet ports and USB ports, to provide images from the cameras to a destination apart from the network, such as a destination remote from the vehicle.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
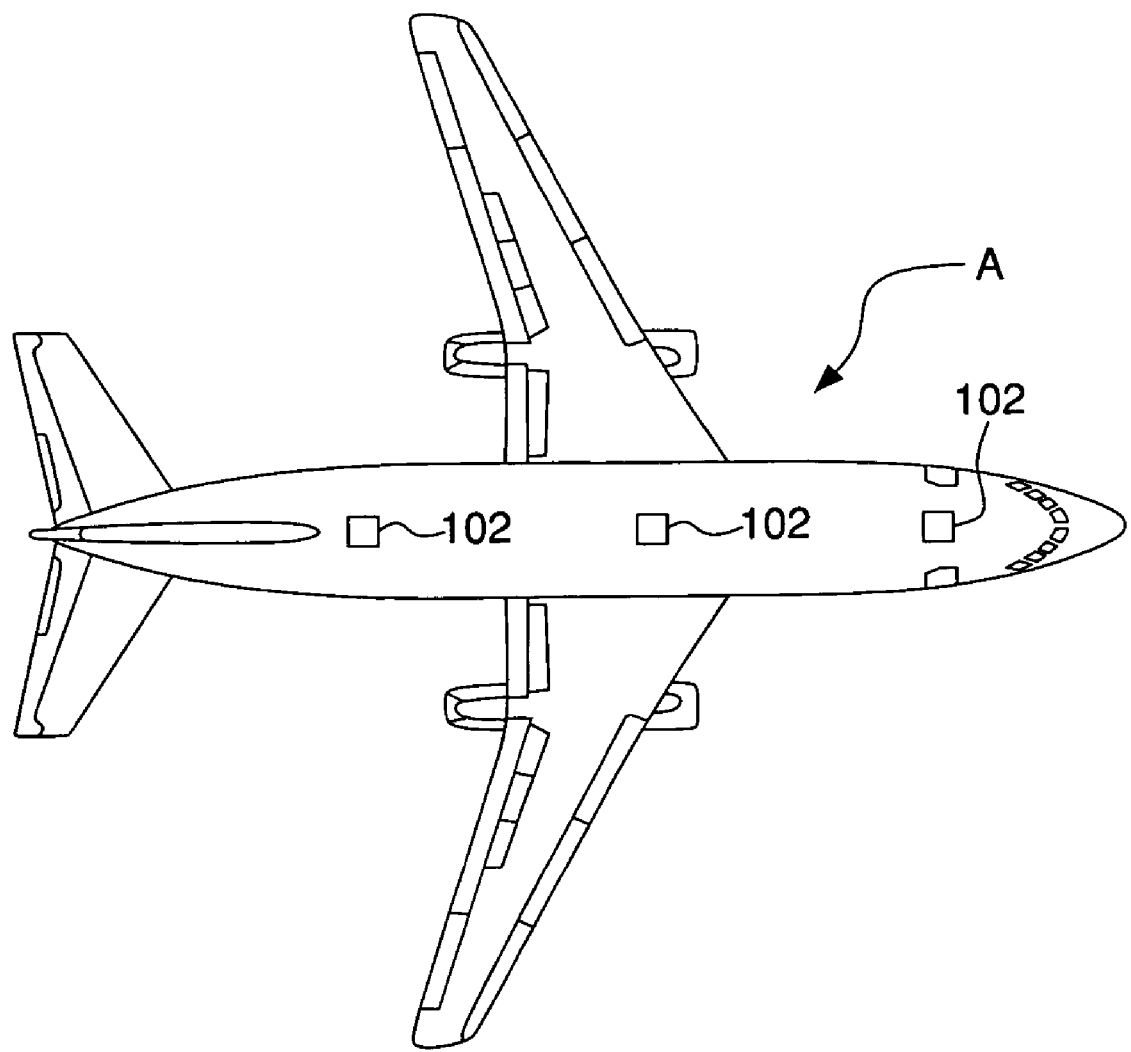
FIG. 1 is a conceptual diagram illustrating an example of camera units and viewing panels of a multi-camera surveillance system according to an embodiment of the present invention deployed in an aircraft.

FIG. 1 illustrates an example of a multi-camera surveillance system 100 employing a plurality of network camera units (NCU) 102 according to an embodiment of the present invention that are deployed at strategic locations in the cabin of a commercial aircraft A. For example, one NCU 102 can be deployed near the front of the cabin, another near the center of the cabin, and a third at the rear of the cabin. In larger aircraft such as Boeing 747 class aircraft having separate first-class and business-class sections and an upper level section, additional NCUs 102 can be deployed in these sections.

Each NCU 102 should be small and light, and should include a quality lens that provides sufficient resolution, even in dim lighting. Each NCU 102 should support a variety of resolutions, operating modes, sample rates, and compression technologies. An NCU 102 can operate on DC power, and can be powered by Power-Over Ethernet (PoE) technology. An example of a suitable NCU 102 is described in detail in U.S. Pat. No. 6,824,317, issued Nov. 30, 2004, and entitled "Universal Security Camera", the entire content being incorporated herein by reference.

Figure 2:
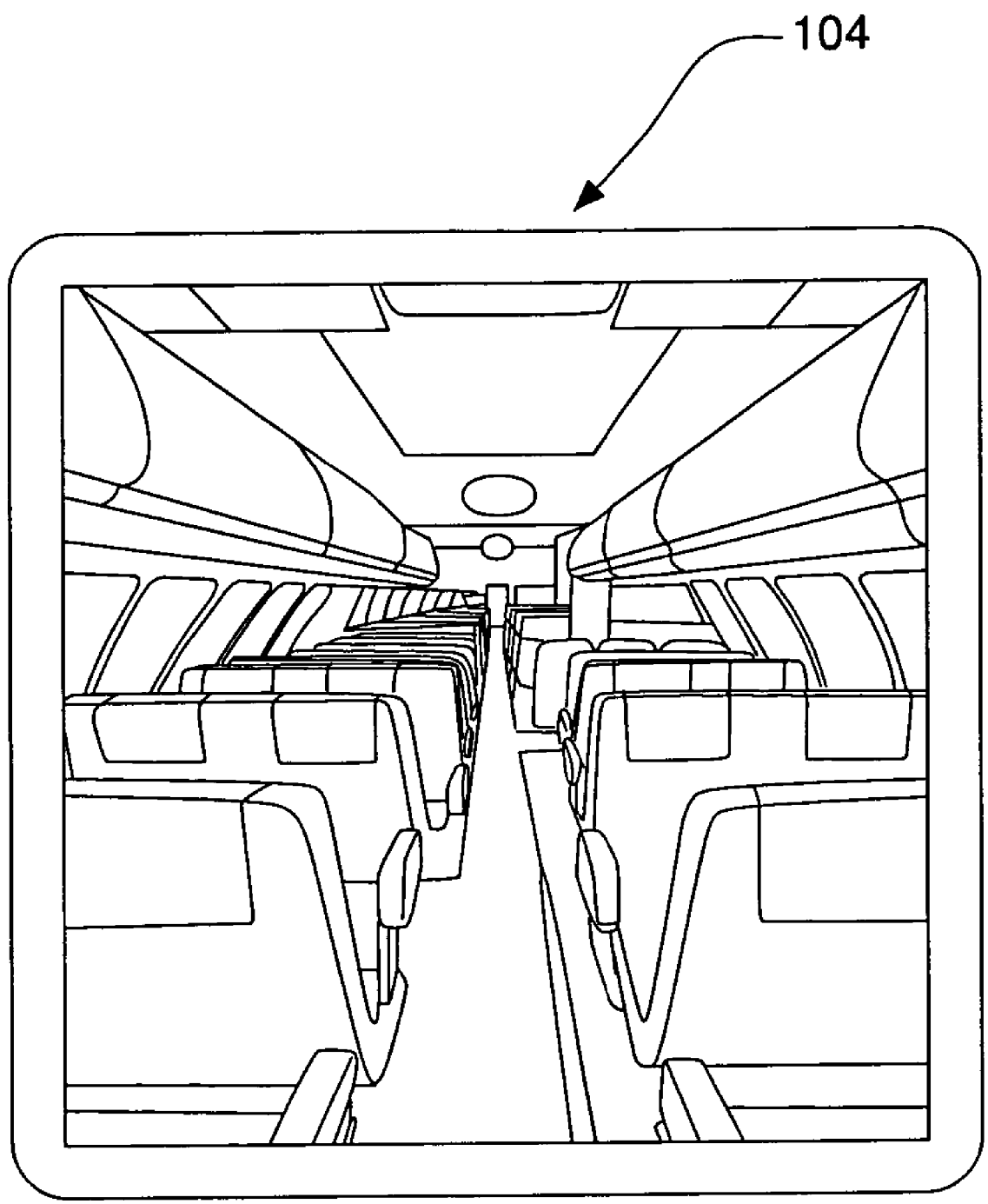
FIG. 2 is a diagram of an example of a viewing panel as shown in FIG. 1.
Figure 3:
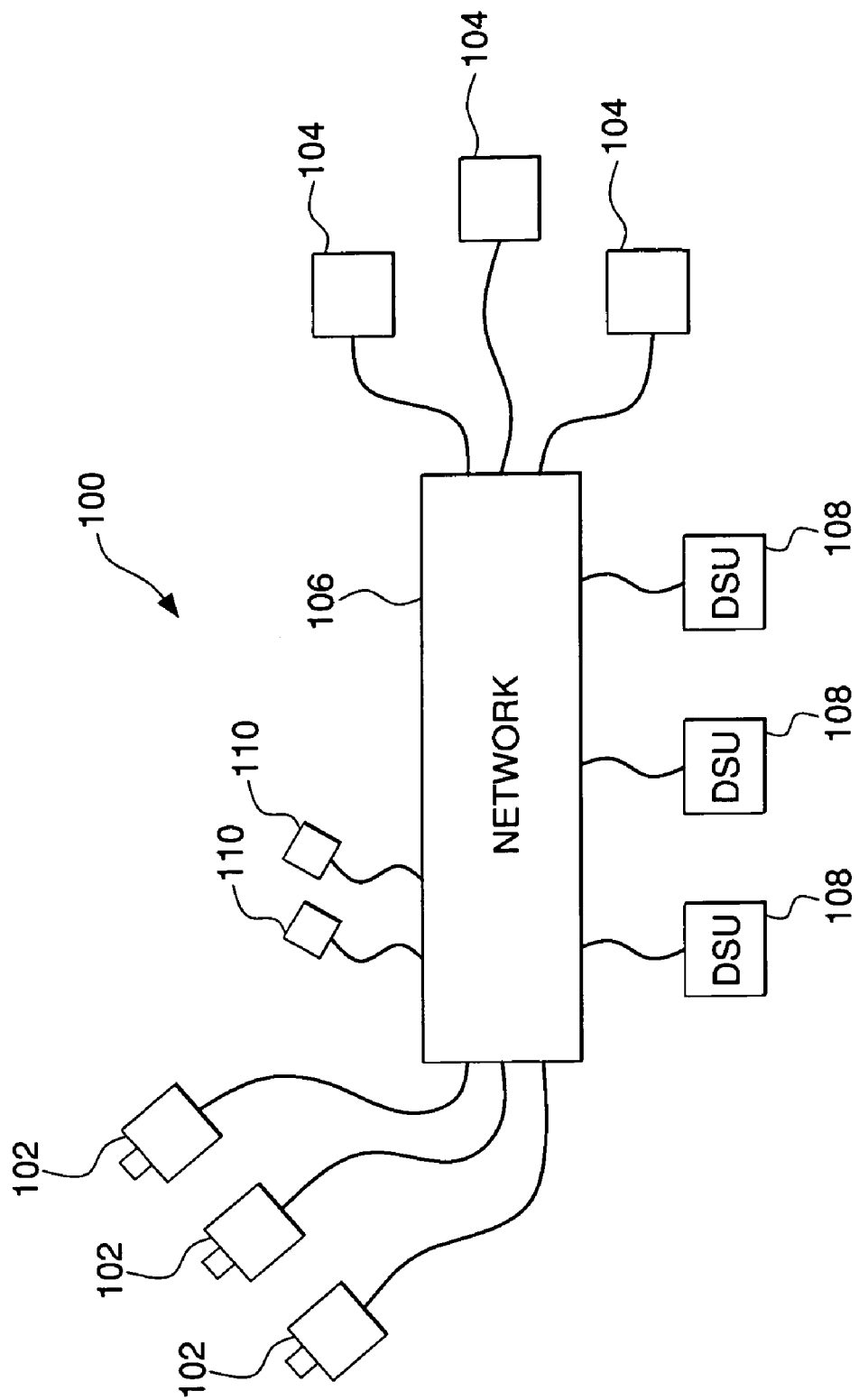
FIG. 3 is a schematic diagram illustrating an example of the interconnection between the camera units, viewing panels and network according to an embodiment of the present invention.

As further shown in FIGS. 1-3, the system 100 includes a plurality of viewing panels 104 that can be positioned at viewing stations that are conveniently located in the cabin of the aircraft for viewing by aircraft personnel such as flight crew and cabin crew. For example, a viewing panel 104 can be located in the cockpit for viewing by flight crew, and a viewing panel 104 can be located at each flight attendant station for viewing by flight attendants when performing their normal duties. Consideration should also be given to the ability to use viewing panels already available on the aircraft, as well as the use of a portable panel, such as a laptop computer, for viewing and image offload. Accordingly, as shown in FIG. 2, each viewing panel 104 can therefore display a real-time or frame image of an area within the cabin of the aircraft as captured by an NCU 102 that is providing image data to the viewing panel 104 as will now be discussed.

As shown in the schematic of FIG. 3, the NCUs 102 and viewing panels 104 are coupled to a network 106 comprising one or more digital server units (DSU) 108 employed in the aircraft. As can be appreciated by one skilled in the art, a DSU 108 is a high capacity Ethernet server, such as an iSeries DSU-D2 which, with minor modification to provide PoE capability permit this type of DSU to attach to a 3 cameras and a viewing panel with no additional infrastructure required. The DSU 108 can also use an Ethernet connected and become a server node on another aircraft data network, such as a complete iSeries system. A DSU 108 can thus operate to store images captured by the NCUs 102.

Each NCU 102 connects to the DSU 108 over a 100BaseT communications interface. Each NCU 102 will operate as a Real Time Protocol (RTP) server capable of providing multiple image streams to network connected devices, such as the DSU 108 and viewing panels 104 either directly via the network 106 or via the DSU 108. The DSU 106 or viewing panel 104 wanting to receive the image establishes an RTP session using the associated Real-Time Streaming Protocol (RTSP) protocol. An NCU 102 only transmits image data to devices such as a viewing panel 104 or DSU 108 that have set up an RTP session. Devices no longer desiring image data or longer connected will be terminated. Each NCU 102 should support a minimum of 4 simultaneous RTP sessions, but can be configured to support more RTP sessions if desirable.

It is noted that due to the variety of applications appropriate for this system 100, it is desirable for each NCU 102 to have a variety of operating modes and features. For example, an NCU 102 should have variable resolutions from 320×240 to as high as 1000×1000. An NCU 102 should have variable frame capture rates from as high as 15 frames per second to as slow as 1 frame per second, and on-change capture that provides images only when the change in the image meets a configured criteria. The NCUs 102 should also be capable of video encoding in MPEG1, MPEG2, MPEG4 or Motion JPEG formats. Selection of the operating mode should be accomplished through the initialization and setup of the system 100. Also, although an NCU 102 can be configured to support one set of options, it is highly desirable for an NCU 102 to simultaneously support a fixed frame rate for display on a viewing panel 104 and an on-change capture for storage by a DSU 108.

The network 106 can also provide an optional off-aircraft connection for external users or recorders. The network 106 can provide two types of offload interfaces 110, namely, an RJ45 Ethernet port and a USB 2.0 port, but can also be configured to provide additional types of offload interfaces. The RJ45 Ethernet port is provided to permit portable viewing panels such as laptops and intelligent storage to be attached to the system 100. These types of ports could also be used as a connection to an off-aircraft gate communications system. The USB port permits the attachment of a USB memory device to the system 100. At a minimum, a viewing panel can incorporate at least one USB port for this purpose.

Accordingly, as can be appreciated from the above, the control features of the network 106 enables a user, such as a crew member, to select an image to view from any NCU 102 at multiple viewing panels 104. The network 106 enables each viewing panel 104 to present images from multiple NCUs 102 if desired. The DSUs 108 or offload devices discussed above can record images from all of the NCUs 102, and allow for removal of images in a quick and easy manner. For instance, as discussed above, each external gate interface permits viewing and recording of on-aircraft images captured by the NCUs 102 to be performed by off-aircraft systems. Also, all of the images captured by the NCUs 102 should be of sufficient quality to allow for their detailed analysis and enhancement.

While this invention has been particularly shown and described with reference to preferred embodiments thereof, the preferred embodiments described above are merely illustrative and are not intended to limit the scope of the invention. It will be understood by those skilled in the art that various changes in form and details may be made therein without departing from the spirit and scope of the invention as defined by the appended claims.

What is claimed is:

1. A multi-camera surveillance system for use on a vehicle, comprising:
   a plurality of cameras, each operating as a Real Time Protocol (RTP) server for providing multiple image streams, and each being configured for deployment at respective locations in the vehicle;
   at least one viewing panel, adapted for deployment at a respective location in the vehicle that is connectable to each of the plurality of cameras using an associated Real-Time Streaming Protocol (RTSP) to establish an RTP session with a respective said camera;
   at least one digital server unit (DSU) that is connectable to each of the plurality of cameras using an associated Real-Time Streaming Protocol (RTSP) to establish an RTP session with a respective said camera, each adapted to store at least one image captured by at least one of the cameras; and
   a network, deployed in the vehicle, coupling the plurality of cameras and the at least one viewing panel to each other, and operating to receive the multiple image streams from each of the plurality of cameras operating as an RTP server, to enable each viewing panel to selectably view an image captured by any of the cameras or to selectably view a plurality of images captured by a plurality of the cameras simultaneously.

2. A multi-camera surveillance system as claimed in claim 1, comprising:
a plurality of said viewing panels.

3. A multi-camera surveillance system as claimed in claim 1, wherein the network comprises a plurality of DSUs.

4. A multi-camera surveillance system as claimed in claim 1, wherein:
each of the cameras operating as an RTP server provides images to the at least one DSU using real time protocols (RTP).

5. A multi-camera surveillance system as claimed in claim 1, wherein the network comprises:
at least one offload interface, adapted to provide images from the cameras to a destination apart from the network.

6. A multi-camera surveillance system as claimed in claim 5, wherein the destination is remote from the vehicle.

7. A multi-camera surveillance system as claimed in claim 5, wherein the network comprises:
a plurality of offload interfaces, comprising at least one of an RJ45 Ethernet port and a USB port.

8. A multi-camera surveillance system as claimed in claim 1, wherein:
the camera encodes the images into at least one of MPEG1, MPEG2, MPEG4 or Motion JPEG formats.

9. A multi-camera surveillance system as claimed in claim 1, wherein the network comprises:
a Power-Over Ethernet (PoE) power supply, adapted to supply power to the cameras.

10. A multi-camera surveillance system as claimed in claim 1, wherein:
the vehicle is an aircraft.

11. A method for deploying a multi-camera surveillance system in a vehicle, comprising the steps of:
deploying a plurality of cameras at respective locations in the vehicle, with each of the cameras being a Real Time Protocol (RTP) server for providing multiple image streams;
deploying at least one viewing panel at a respective location in the vehicle;
deploying a network in the vehicle, and coupling the plurality of cameras and the at least one viewing panel to each other via the network;
initiating an RTP session by the at least one viewing panel to at least one of the cameras using a Real-Time Streaming Protocol (RTSP);
operating each of the cameras to provide the multiple image streams via camera RTP sessions;
deploying at least one digital server unit (DSU) in the vehicle and coupling each DSU to the network;
initiating an RTP session by the at least one DSU at least one of the cameras using a Real-Time Streaming Protocol (RTSP);

operating the network to enable each DSU to store at least one image captured by at least one of the cameras via the DSU RTP session;
operating the network to receive the multiple image streams from each of the plurality of cameras operating as an RTP server to enable each viewing panel to selectably view an image captured by any of the cameras or to selectably view a plurality of images captured by a plurality of the cameras simultaneously.

12. A method as claimed in claim 11, wherein the viewing panel displaying step comprises:
deploying a plurality of said viewing panels in the vehicle.

13. A method as claimed in claim 11, wherein the DSU deploying step comprises:
deploying a plurality of DSUs in the vehicle.

14. A method as claimed in claim 11, wherein the operating step includes:
operating the cameras as the RTP servers to provide their images to the at least one DSU using real time protocols (RTP).

15. A method as claimed in claim 11, further comprising:
deploying at least one offload interface in the vehicle; and
operating the network to provide images from the cameras to a destination apart from the network via the offload interface.

16. A method as claimed in claim 15, wherein the destination is remote from the vehicle.

17. A method as claimed in claim 15, wherein the offload interface deploying step comprises:
deploying a plurality of offload interfaces, comprising at least one of an RJ45 Ethernet port and a USB port, in the vehicle.

18. A method as claimed in claim 11, wherein operating step comprises:
operating the camera to encode the images into at least one of MPEG1, MPEG2, MPEG4 or Motion JPEG formats.

19. A method as claimed in claim 11, further comprising:
deploying a Power-Over Ethernet (PoE) power supply, and operating the PoE to supply power to the cameras.

20. A method as claimed in claim 11, wherein:
the vehicle is an aircraft.

21. A multi-camera surveillance system as claimed in claim 1, wherein
at least one of the plurality of cameras provides its multiple image streams directly to at least one said viewing panel via the network without providing the multiple image streams to a server external to said at least one of the plurality of cameras.

22. A method as claimed in claim 11, wherein
the step of operating the network comprises providing the multiple image streams from at least one of the plurality of cameras directly to at least one said viewing panel without providing the multiple image streams to a server external to said at least one of the plurality of cameras.

* * * * *